United States Patent [19]

Russell

[11] Patent Number: 4,867,902

[45] Date of Patent: Sep. 19, 1989

[54] MICROENCAPSULATED OXYGEN GENERATORS

[75] Inventor: Donald H. Russell, Cherry Hill, N.J.

[73] Assignee: Z-Gard, Inc., Kansas City, Mo.

[21] Appl. No.: 172,731

[22] Filed: Mar. 23, 1988

[51] Int. Cl.$^4$ .................. A62D 9/00; C01B 15/043
[52] U.S. Cl. .................. 252/186.32; 252/186.27; 252/186.33; 252/186.43; 423/581; 428/402.24; 427/213.36; 427/220; 427/221
[58] Field of Search .............. 252/186.27, 186.32, 252/186.33; 427/213.36; 428/402.24

[56] References Cited

U.S. PATENT DOCUMENTS

| | | | |
|---|---|---|---|
| 3,645,911 | 2/1972 | Besauw | 252/186.33 |
| 3,691,090 | 9/1972 | Kitajima et al. | 428/402.24 |
| 3,992,317 | 11/1976 | Brichard et al. | 252/186.32 |
| 4,020,833 | 5/1977 | Rind | 252/186.32 |
| 4,120,812 | 10/1978 | Lutz | 252/186.32 |
| 4,178,351 | 12/1979 | Klebe et al. | 252/186.32 |
| 4,490,272 | 12/1984 | Malafosse et al. | 252/186.43 |
| 4,526,698 | 7/1985 | Kuroda et al. | 252/186.27 |
| 4,547,429 | 10/1985 | Greiner et al. | 428/402.24 |
| 4,731,197 | 3/1988 | Eckstein et al. | 252/186.32 |
| 4,756,844 | 7/1988 | Walles et al. | 252/186.32 X |

*Primary Examiner*—Brooks H. Hunt
*Assistant Examiner*—Virginia B. Caress
*Attorney, Agent, or Firm*—Hedman, Gibson, Costigan & Hoare

[57] ABSTRACT

An oxygen generating microencapsulated composition includes an oxygen generating core material and a coating which is water swellable. When exposed to water, the coating ruptures in an exfoliating manner, exposing the core material to water and thereby generating oxygen. The rate of oxygen release from the microcapsule can be controlled by altering wall continuity, thickness, capsule diameter, and coating characteristics. In other embodiments, combustion resistant materials are included in the wall material.

30 Claims, No Drawings

MICROENCAPSULATED OXYGEN GENERATORS

FIELD OF THE INVENTION

The present invention relates to novel micro-encapsulated formulations of oxygen generating compounds, such as potassium peroxide and superoxide. The microencapsulation of these compounds provides products with controllable reactivity which generate less exothermic heat when mixed with water and which do not form carbonate crusts.

BACKGROUND OF THE INVENTION

It is well known in the art to use alkali metal and alkaline earth metal peroxide and superoxide chemicals as oxygen sources. Methods for releasing the oxygen have included introducing the chemical into a water containing reactor. For example, potassium superoxide is well known to react vigorously and almost instantly with water to evolve heat and oxygen with potassium hydroxide as the by-product.

Chemical source respirators and rebreathers use two chemicals almost exclusively; namely potassium superoxide ($KO_2$) and anhydrous lithium hydroxide. In these applications, moisture in the breath is used as the activator. Both of these chemicals, which are in solid form, react with water exothermically to produce a hydrated metal hydroxide. LH does not liberate $O_2$, but effectively absorbs $CO_2$ in its hydrated form. It is limited to use in emergency rebreathers of short service life since no additional oxygen is provided. Potassium superoxide reacts with water to produce oxygen and hydrated potassium hydroxide. In a second reaction, the hydrate absorbs respired $CO_2$ to form a carbonate/bicarbonate mixture. Surface crusts of carbonate sludge are formed with both of these chemicals due to agglomeration which interferes with continued water reaction and gas absorption.

Due to the formation of the carbonate sludge, the practical use of these chemical sources of oxygen has been shown to be inefficient. For instance, at high breathing rates (where moisture and $CO_2$ levels are very high) there can be a 30 to 40% efficiency loss due to crusting of carbonates sludge. In practice, the efficiency loss is compensated for by using large excesses of these chemicals which is wasteful. In the case of potassium superoxide enough exotherm heat is created to require external heat exchangers on the potassium superoxide cannisters. However, this requires bulky oversized equipment. In addition, potassium superoxide is especially difficult to handle because its reaction with water is extremely fast and uncontrollable.

Because of the extremely rapid reaction of potassium superoxide and the like with water, many uses require that it be made into compressed briquette or blocks in order to control the rate of reaction. The increased density of the potassium superoxide in briquette form slows the diffusion of moisture into the chemical and extends the oxygen delivery time.

For instance, chemical oxygen masks based on potassium superoxide and the like use external cannisters with heat exchangers to hold the chemical, which is usually in the form of compacted blocks and arranged in a fashion that allows for air circulation. The cannisters have to be remote from the breathing mask because of their size, weight, and heat output. The inherent disadvantages of this type of remote unit are obvious. These units are cumbersome and wasteful of the potassium superoxide, which is expensive. Powdered potassium superoxide reacts instantly and efficiently with water and does not crust, but its reaction rate cannot be controlled.

Attempts to solve the above-mentioned problems which are inherent in these oxygen generating systems have been attempted in the prior art, but for the most part these systems have been cumbersome and only partially effective. For instance, U.S. Pat. No. 3,574,561 (Nickerson et al.) discloses an improved technique for controllably releasing oxygen from alkali metal peroxide or superoxide by spraying water upward onto the chemical contained in a downwardly directed elongated cartridge, and providing for gravity escape of the sprayed water plus hydroxide product This apparatus allows the solid state chemical to be progressively dissolved, and avoids the cleaning problems caused by the formation of carbonate sludge. The released oxygen is funneled into a delivery tube.

It has now been surprisingly found that microencapsulation of alkali superoxides, etc., in a water swellable capsule material provides particles with controllable reactivity which do not form carbonate crusts. In addition, these microcapsules exhibit less exothermic heat release when reacted with water, thus greatly reducing the need for separate heat exchangers. The microcapsule technique also can be used advantageously with anhydrous lithium hydroxide to inhibit carbonate crust formation during $CO_2$ absorption by the hydrate.

SUMMARY OF THE INVENTION

In accordance with the above, the present invention relates to a microencapsulated composition comprising
(i) a core material comprising an oxygen generating compound; and
(ii) a coating comprising an acceptable wall-forming polymer which is swellable in water.

In preferred embodiments, the core material comprises an alkali metal superoxide or peroxide, while the coating comprises any of a large number of polymeric systems including blends and alloys suitable for capsule wall materials. Preferably, the coating comprises olefinic homopolymers or copolymers with vinyl compounds, polyamides, polyurethanes, gelatins, starches, gums and the like.

In other embodiments, the coating may be dispersed in a neutral solid diluent.

The present invention also relates to microencapsulated oxygen generating compounds which are surface coated with small amounts of hydrophobic materials in order to inhibit or slow the absorption of moisture by the capsule. This surface coating may be used concurrently or in place of capsulation.

Other embodiments of the present invention include providing a wall material for the oxygen generating compound which is combusion resistant, i.e., fire retardent or resistant. Water activated release of oxygen in this type of wall materials may be accomplished by including leachable water soluble salts, or by creating controlled cracks in the wall material on curing or drying In preferred embodiments, the combustion resistant wall material comprises ceramics, certain sol-gel compositions, char forming phenolic resins, organic polymers having large amounts of heavy metals attached to the polymer backbone, low melting silicates and borates, mixtures of organic polymers with certain metal oxides and non-volatile halogen-containing compositions.

DETAILED DESCRIPTION OF THE INVENTION

Encapsulation, and more specifically microencapsulation, is a technique for producing controlled release delivery systems The capsule walls protect the core material from hostile environments, but can release the interior core under specific stimulus (heat, pressure, pH, etc.). The release can be instantaneous or preferably at a constant rate.

Essentially, microencapsulation entails applying thin coatings reproducibly to small particles of solids, droplets of liquids, or dispersions, thus forming microcapsules. This technique can be readily differentiated from other coating methods in that the size of the particles which are to be coated range from severals tenths of a micron to 5,000 microns in size.

The basic microencapsulation process used to produce the oxygen generating microcapsules of the present invention involves three steps: (1) dispersion of the core material in a continuous fluid; (2) precipitation of a wall former (usually a polymer) onto the dispersed phase with which it is non-reactive under dry conditions; and (3) hardening of the polymer wall by appropriate means. The encapsulated product is isolated and dried to remove any volatiles.

The deposition of the liquid polymer around the core material occurs only if the polymer is absorbed at the interface formed between the core material and the liquid vehicle phase. Moreover, the hardening of the polymer wall may be accomplished by heat, crosslinking, or dissolution techniques.

The equipment required for microencapsulation of the oxygen generating compositions of the present invention is relatively simple. It consists of mainly of jacketed tanks with variable speed agitators. However, any of the well-known devices used in the art for microencapsulation may be used in the production of the microcapsules of the present invention.

In the microcapsules of the present invention, the core material is released under the stimulus of moisture. More particularly, the alkali metal superoxide, etc., microcapsules which are appropriately located in the respirator or rebreather are exposed to moisture which is generated by the user's respired air. This moisture is absorbed by the wall material of the microcapsule. The microcapsule wall material becomes softened and swollen as increased amounts of moisture are absorbed. Additional moisture permeates the swollen wall and begins to react with the core material. Eventually, tears in the capsule wall propagate and the wall is peeled back in an exfoliation manner to expose gradually increasing amounts of the surface of the core material. Although the capsule walls peels back in this exfoliation manner, the capsule wall remnants do not fragment. Rather, the capsule wall remnants stay in place around the reacting core material and act as a shield or buffer against contact between exposed reactive particles.

The release rate from the microcapsules of the present invention can be controlled by altering wall continuity and thickness, capsule diameter, and polymer characteristics. Those skilled in this technology can adjust these various parameters to achieve balances of extended controlled release. In this manner, the extremely rapid reaction of the alkali metal superoxide with water can be slowed so that the agglomeration of the formed carbonate sludge is prevented. In addition, the exotherm heat which is created by the reaction is much less than that created by the prior art methods and can be quickly dissipated.

Microcapsule rupture mechanism: It is believed that absorbed moisture plasticizes the capsule wall material, and changes its physical properties from hard and tough to soft and relatively weak. Water transport through the swollen walls to the reactive potassium superoxide particles is facilitated, and the oxygen generating reaction begins. Expanding oxygen inside the capsule ruptures the capsule and the wall material folds back or exfoliates instead of fragmenting as expected. It is the physical properties of the water plasticized wall material that allows retention of the broken capsules contiguously with each particle of core chemical. Agglomeration and crusting of the reaction debris is prevented by the presence of these plastic buffers.

Controlled and uniform reaction rates are achieved because the capsules exfoliate gradually, and the contained cores emerge and react over an extended period instead of suddenly. Conventional microcapsules rupture by fragmentation (pressure and/or dissolution) and the total surfaces of the core and released immediately. Since there is no means of shielding the core surfaces, reaction rate is uncontrolled and no mechanism for crusting prevention is available. Although capsules of different dissolution rates can be used, the chemical release would be in a series of bursts rather than by gradual reaction.

Besides potassium superoxide, other chemicals that release oxygen by reaction with water and which can be microencapsulated and used alternatively are the alkali and alkaline earth metal peroxides, superoxides, trioxides, percarbonates, and permanganates. Moisture reactive compounds that liberate gases other than oxygen and which can be encapsulated are the alkali and alkaline earth hydrides (hydrogen release) and carbides (acetylene release). Ammonium salts of weak acids (carbonate or sulfide) will release ammonia.

Anhydrous lithium hydroxide (ALH) and the anhydrous oxides and hydroxides of alkali and alkaline earth metals all form monohydrates with water and in this form they become selective $CO_2$ absorbers. In all cases the $CO_2$ reaction products form watery sludges that agglomerate into crusts. The crusting inhibits further gas absorption and efficiency is reduced. ALH is the most effective $CO_2$ absorber of this group and is used commercially in rebreathers, but it does not liberate oxygen.

The oxygen generating compounds which are within the scope of the present invention include the alkali and alkaline earth oxides, peroxides, superoxides, hydroxides, percarbonates In preferred embodiments, the oxygen generating compound is potassium superoxide.

A large number of polymeric systems, including blends and alloys, are suitable for the capsule wall materials of the present invention. The primary requirements for these polymeric systems are film forming capability and controlled absorption and swelling in water. The various polymer structures can be manipulated to obtain desired features.

In particular, the polymeric wall materials may comprise olefin copolymers with vinyl acetate, vinyl alcohol derived from hydrolyzed vinyl acetate, acrylic acid, methacrylic acid and their salts, the alkyl, hydroxy alkyl and amino alkyl, acrylic and methacrylic esters, maleic anhydride, maleate esters and maleate salts, vinyl alkyl ethers, vinyl pyridine, vinyl pyrollidone, and vinyl sulfonic acid, its esters and salts, and the like. Suitable olefins include ethylene, propylene, isobutylene, styrene, mixtures of any of the foregoing and the like. The polymeric wall material may also include homopolymers of the vinyl monomers, acrylics, and maleic anhydride systems mentioned above. Also suitable for use as polymeric wall materials are the anhydrous high molecular weight (greater than 500 MW wt. av.) polymeric alkylene oxide polyols and alkoxy derivatives. An example of these are the Carbowax polyols, available from Union Carbide. Blends, alloys, and dispersions of the above-named polymers with each other, or in neutral solid diluents such as paraffin waxes are also suitable. Other suitable polymeric wall materials include polyamides and polyurethanes which have been modified for high hydrophilicity.

In addition to the above, gelatins, starches, natural and synthetic gums and their chemically modified and/or cross-linked forms may also be used to comprise the wall materials.

As previously stated, microcapsules in accordance with the present invention may generally range in size from about several tenths of a micron to about 5000 microns in diameter. In preferred embodiments, the diameter of the microcapsules ranges from about 250 microns to about 1000 microns.

Another way of controlling the reactivity of the alkali metal superoxides and the like is by means of slow release monolithic coatings or castings utilizing water soluble but chemically non-reactive binders. This method does not give uniform reactivity control and is useful only in less demanding applications. Typical reactivity of the monolithic systems is non-linear and decreasing step-wise as a function of binder solubility. The materials of choice are solid high molecular weight polyethylene glycols (PEGs) which are avaiable in a range of molecular weights and degrees of water solubility. These polyethylene glycols are also useful as binders for moisture activated controlled release systems, such as the microcapsules of the present invention. Carbowax polymers, which are solid at room temperatures and which are available in a range of molecular weights and water solubilities are the PEGs of choice. They are mutually compatible and can be blended to achieve desired properties. Thus, the carbowaxes may be used to control the degree of moisture sensitivity and rate of solution in water, since the hygroscopicity and water solubility of carbowaxes decrease with their increasing molecular weight.

Blends of the carbowaxes with the alkali metal superoxides, etc., are made by first melting the glycols, stirring in the powdered chemicals, casting coatings or layers, and then allowing them to resolidify at room temperature. The resulting products remain stable when stored in dry air. Although the polymeric glycols are not reactive with the alkali metal superoxides, etc., they must first be thoroughly dehydrated to remove any entrained water. The resulting mats or fabrics are useable as filters in breathing masks and provide slow release of oxygen.

An additional means of controlling the rate of moisture absorption by the microcapsules of the present invention is to surface coat them with small amounts of hydrophobic grade colloidal silica. An example of such is Cab-O-Sil ® TS-720, available from Cabot Corp. The coating is accomplished by simple mechanical tumbling of the dry blends of microcapsules and colloidal silica. The silica particles, which are much smaller (approximately 0.1 microns) than the microcapsules, become lodged in their surface interstices. A discontinuous silica layer is formed which inhibits or slows moisture uptake, but does not block it completely. It also acts as an anti-blocking agent for possible microcapsule caking.

It is also contemplated that the microcapsules of the present invention comprise an oxygen generating compound as a core material and a combustion resistant wall material which also allows the core material to produce oxygen at a controlled rate when the microcapsule is exposed to moisture. Combustion resistance for the purposes of the present invention can mean completely non-flammable, decreased flammability, and/or self-extinguishing.

When a non-flammable coating is desired, a number of materials are suitable, including effective amounts of ceramic or ceramic-organic cements, sol-gel compositions derived from alcoholates of Al, B, Si or Ti, and metal rich cements of zinc oxide with certain terpenic compounds such as zinc oxide/eugenol dental cement.

When decreased flammability is desired, effective amounts of char-forming phenolic resins which convert thermally to non-combustible structural carbon residues are suitable. Also suitable are organic polymers with large amounts of heavy metals chemically attached to the polymer backbone. Examples include copolymers with acrylates and methacrylates of Zn, Zr, Fe, Ti, Sn or W, or olefin-maleic anhydride adducts of the same metal series. Other compounds, such as intumescent agents, including low melting silicate and borate compounds are also suitable.

Self-extinguishing wall materials can be provided by the addition of effective amounts of oxides known to confer self-extinguishing properties to organic polymers. Although many such metal oxides such as Zn, Sb and Ti are suitable, alumina trihydrate is the preferred oxide because it also liberates 3 moles of water on moderate heating. Non-volatile halogen containing compounds and polymers can also be used. However, these compounds present separate health hazards by the production of halogen gases and vapors.

Water activated release of oxygen from the cores of these combustion resistant materials is achieved by including effective amounts of leachable water soluble salts, such as sodium or potassium chlorides, carbonates or phosphates, or by selecting systems in which shrinkage stresses create controlled defects or cracks through which moisture can be controllably absorbed on drying.

DESCRIPTION OF THE PREFERRED EMBODIMENTS DETAILED

Specific embodiments of the present invention are taught in the following examples which are not limiting in any way.

EXAMPLE 1

Microcapsules were prepared using a core material comprised of potassium superoxide ground and sieved to specific particle sizes. The microcapsules which were prepared by grinding commercial lump grade $KO_2$ (Aldrich Chemical Co.) to a powder in a mortar and pestle within a dry box with a dry $N_2$ atmosphere, and then seived to a nominal 20-24 mesh (0.84-1.0 mm.) for use in making microcapsules. A typical seive analysis was:

| Tyler Screen No. | % bw retained |
| --- | --- |
| 12 | 0 |
| 14 | 2 |
| 16 | 3.5 |
| 18 | 5 |
| 20 | 43.5 |
| 24 | 39 |
| 28 | 6 |
| 32 | 1 |

A 10% bw solution of Elvax 40W (60% ethylene/40% vinyl acetate having a number average mol. wt. of about 80,000 and a melt index of 48-66 decigram/min ASTM D 1238 (mod)) was prepared in a solvent blend of 1/1 toluene/n-butanol as follows 50 gms. of Elvax 40W (dried 24 hrs. in a vacuum dessicator) were added to 500 ml of solvent (dried over mole seives) in a 1 liter three-necked round bottom pyrex flask fitted with a stirrer, powder funnel, and a reflux condenser through which a stream of dry $N_2$ was introduced. The mixture was heated to 50°-60° C. with a Glascol mantle and stirred until solution was completed.

The Elvax 40W solution maintained at 50°-60° C. was transferred to the dry box and 10 gms of sized $KO_2$ added slowly through the powder funnel with stirring maintained. After complete powder addition, stirring was continued for 5 minutes, and then the slurry was allowed to settle.

The supernatant liquid was decanted, the coated particles transferred to a large heated Buchner funnel containing a glass fiber filter sheet, and vacuum filtered to a damp condition. The particles had to be stirred in the funnel to prevent their adhesion to each other. A solvent hardening step was inserted prior to vacuum filtration to eliminate particle/particle adhesion.

The resulting capsules were free flowing, non-tacky, and spherical with about 72% bw core $KO_2$ and about 36 micron wall thickness. When placed in RT water, oxygen release occurred over a period of 28-30 minutes.

After removal of supernatant liquid as above, the damp, coated particles were slurried in 1 liter of naphtha (mineral spirits) at RT for about 5 minutes to solvate residual toluene/n-butanol and harden the coating. Vacuum filtration was done according to the procedure supra, and final drying was done in a vacuum oven (Napco Model 5851) at 60° C./100 mm Hg for 24 hours.

EXAMPLES 2-9

Example 1 was repeated using a 5.5% Elvax 40W solution and yielded capsules with 84% core material and a 29 micron wall thickness. Oxygen was released for 15-18 minutes when these capsules were put in RT water.

A 2% solution of Elvax 40W in anhydrous methanol was made by heating under reflux with stirring. Solid NaOH was added to a level of 0.05gm/gm of resin in solution. Heating and stirring under reflux was continued for 3-4 hours.

The partially hydrolysed resin was precipitated by pouring the alcohol solution into a large excess of cold water. The precipitate was washed with 10% HCl to remove residual base, and then washed with distilled water until the washings were neutral to pH paper. Final drying was done in a vacuum oven at RT for 36 hours.

Hydrolysis was estimated from spectrographic analysis of resin films at about 10-20% of the contained vinyl acetate.

The hydrolysed resin was made into a 5% solution in dry toluene, and used to coat sized $KO_2$ particles as in Example 2. The resulting microcapsules had 78% core material and a wall thickness of about 30 microns. When placed in water, oxygen release occurred over 8-9 minutes and demonstrated the increased water sensitivity of the wall material.

The microcapsules may be made in the size range of from about 10 to about 1000 microns by varying the procedure set forth above. Examples 3-9 provide the measurements of seven different microcapsules having varying capsule diameters, wall thickness, and varying amounts of oxygen generating core material, determined as a percentage by weight of the total weight of core material and wall material. The results are shown in Table 1.

Microscopic observations of the water wetted potassium superoxide microcapsules exposed to human breath showed that the exfoliated capsule fragments prevented the agglomeration of the formed carbonate sludge. The microcapsules thus retained high levels of oxygen release efficiency.

The unit weight and size of the capsules was low, and moisture and gas diffusion times were negligible. The exothermic heat produced by the reaction of the potassium superoxide and water was quickly dissipated.

As can be seen from the results provided in Table 1, the microcapsules exposed and wetted by moisture from human breath released the entire amount of oxygen generated by the reaction of the potassium superoxide and water over a range of from about 3 minutes to about 40 minutes, depending upon the relative capsules diameter, wall thickness and percentage of potassium superoxide by weight as a percentage of the total weight of the microcapsule. In addition, substantially uniform (near zero order) oxygen release rates were attained. Furthermore, these results show that both the rate and duration of the oxygen production can be controlled by manipulation of the encapsulation parameters.

EXAMPLES 10-15

Microcapsules having the same composition as those set forth in Examples 2-9 were prepared. Thereafter, the microcapsules were coated with colloidal silica by mechanically tumbling a 50:50 dry blend of microcapsules and colloidal silica (Cab-O-Sil ® TS-721) for 3-6 minutes. Examples 10-12 had a capsule diameter, wall thickness, and weight percentage of potassium superoxide similar to that of Example 1 prior to coating with the colliodal silica, while Examples 13-15 were similar to Example 9. The amount of oxygen release upon exposure to moisture was measured. However, the percentage of colloidal silica by weight of the total microcapsule was varied between 0 (thereby approximating Examples 9 and 11), 0.1 and 0.3 percent by weight 1. The results are shown in Table 2.

As can be seen from the results obtained, the rate of oxygen release was slowed as the amount of colloidal silica coating was increased.

TABLE 1

OXYGEN RELEASE OF MICROCAPSULES HAVING

TABLE 1-continued

A POTASSIUM SUPEROXIDE CORE WHEN EXPOSED TO WATER

| Example | 3 | 4 | 5 | 6 | 7 | 8 | 9 |
|---|---|---|---|---|---|---|---|
| Capsule Diameter (microns) | 250-1000 | 250-1000 | 250-1000 | 250 | 250 | 250-1000 | 250-500 |
| Capsule Wall Thickness (microns), Av. | 27.5-100 | 27.5-100 | 27.5-100 | 27.5 | 27.5 | 27.5-100 | 27.5-55 |
| Potassium Superoxide (percentage by weight) | 72 | 88 | 72 | 72 | 73 | 72 | 84 |

PERCENTAGE OXYGEN RELEASE AS A PERCENTAGE OF TOTAL

| Elapsed Time (minutes) | | | | | | | |
|---|---|---|---|---|---|---|---|
| 0 | | | | | | | |
| 0.5 | 14.8 | 65 | 20 | 16.4 | 42 | 60 | 11.4 |
| 1.0 | 23.8 | 87 | 44 | 33.8 | 84 | 88 | 17.9 |
| 2.0 | 39.7 | 96 | 80 | 53.2 | 95 | 90 | 27.5 |
| 3.0 | | 100 | | | | 95 | |
| 4.0 | 61.7 | | 100 | 88 | 100 | 100 | 44 |
| 6.0 | 77.6 | | | 100 | | | 60 |
| 8.0 | | | | | | | 71 |
| 10.0 | 90 | | | | | | 78 |
| 12.0 | | | | | | | 83 |
| 14.0 | | | | | | | 92 |
| 20.0 | 100 | | | | | | 96 |
| 40.0 | | | | | | | 100 |

TABLE 2

EFFECT OF ADDED COLLODIAL SILICA ON OXYGEN RELEASE RATE FOR MICROCAPSULES WITH POTASSIUM SUPEROXIDE CORE

| Example | 10 | 11 | 12 | 13 | 14 | 15 |
|---|---|---|---|---|---|---|
| Capsule Diameter (Microns) | 250-1000 | 250-1000 | 250-1000 | 250-500 | 250-500 | 250-500 |
| Capsule Wall Thickness (Microns), Av. | 27.5-100 | 27.5-100 | 27.5-100 | 27.5-55 | 27.5-55 | 27.5-55 |
| Potassium Superoxide (percentage by weight) | 72 | 72 | 72 | 84 | 84 | 84 |
| Colloidal Silica Coating (percentage by weight) | 0 | 0.1 | 0.3 | 0 | 0.1 | 0.3 |

PERCENTAGE OXYGEN RELEASE AS A PERCENTAGE OF TOTAL

| Elapsed Time (minutes) | | | | | | |
|---|---|---|---|---|---|---|
| 1 | 23.8 | 19 | 13 | 11.4 | 10.5 | 8 |
| 4 | 61.7 | 53 | 46 | 44 | 36.5 | 28.5 |
| 10 | 90 | 78 | 66 | 78 | 56.8 | 46.8 |
| 14 | — | 91 | 79 | 92 | 80.8 | 70.8 |

Many variations of the present invention will suggest themselves to those skilled in the art in light of the above detailed description. For example, many other oxygen generating compounds other than those specifically named herein are contemplated for use as core materials. In addition, many other polymeric or combustion resistant coating materials well known to those skilled in the art will be suitable for use as a wall material. Likewise, other coating materials having similar properties to colloidal silica may be substituted in its place. Also, while the preferable size of the particles of core material to be microencapsulated are detailed herein, the size of these particles may not be critical to obtain a controlled release system in other environments of use. Finally, the above detailed control systems may be applied to other water sensitive organic and inorganic compounds as a method of extending reactivities. All such obvious variations are within the full intended scope of the appended claims.

I claim:

1. A microencapsulated composition, comprising
   (i) a core material comprising an oxygen generating compound which is potassium superoxide; and
   (ii) a coating comprising an acceptable wall-forming water swellable polymer.

2. A microencapsulated composition as defined in claim 1, wherein said component (ii) comprises olefin copolymers with vinyl compounds; homopolymers of vinyl monomers; anhydrous polymeric alkylene oxide polyols and alkoxy derivatives having a molecular weight greater than 500; gelatins; starches; gums; polyamides; polyurethanes modified for high hydrophilicity; and mixtures of any of the foregoing.

3. A microencapsulated composition as defined in claim 1, wherein said component (ii) is a copolymer comprising
   (a) an olefin selected from the group consisting of ethylene, propylene, isobutylene and styrene; and
   (b) a vinyl compound selected from the group consisting of vinyl acetate, acrylic acid and methacrylic acid and their salts, the alkyl, hydroxy alkyl and amino alkyl acrylic and methacrylic esters, maleic anhydride, maleate esters, maleate salts, vinyl alcohol, vinyl alkyl ethers, vinyl pyridine, vinyl pyrollidone, and vinyl sulfonic acid, esters and salts.

4. A microencapsulated composition as defined in claim 2, wherein said component (ii) is further mixed with a neutral solid diluent.

5. A microencapsulated composition as defined in claim 3, wherein said component (ii) is further mixed with a neutral solid diluent.

6. A microencapsulated composition as defined in claim 1, wherein said component (ii) comprises a cross-linked gelatin, starch, or natural or synthetic gum.

7. A microencapsulated composition as defined in claim 1, wherein said component (i) comprises a particle ranging in diameter from about 250 microns to 1000 microns.

8. A microencapsulated composition as defined in claim 7, wherein said component (i) comprises from about 72 to about 88 percent by weight of the total composition.

9. A microencapsulated composition as defined in claim 1, wherein said component (ii) has a wall thickness of from about 27 microns to about 100 microns.

10. A microencapsulated composition as defined in claim 1, further comprising
(iii) a surface coating comprising a hydrophobic material.

11. A microencapsulated composition as defined in claim 10, wherein said component (iii) is a hydrophobic colliodal silica.

12. A microencapsulated composition as defined in claim 11, wherein said component (iii) comprises from about 0.1 to about 0.3 percent by weight of the total composition.

13. A microencapsulated composition as defined in claim 1, wherein said component (ii) comprises a solid dehydrated high molecular weight polyethylene glycol.

14. A microencapsulated composition as defined in claim 1, wherein said component (ii) includes an effective amount of a combustion resistant compound.

15. A microencapsulated composition as defined in claim 14, wherein said component (ii) comprises an organic copolymer with acrylates, methacrylates or olefin maleic anhydride adducts of Zn, Zr, Fe, Ti, Sn or W.

16. A microencapsulated composition as defined in claim 14, wherein said component (ii) comprises a mixture of an organic polymer with an effective amount of a metal oxide.

17. A microencapsulated composition as defined in claim 16, wherein said metal oxide and oxides comprises alumina trihydrate, and oxides of Zn, Sb and Ti.

18. A microencapsulated composition as defined in claim 14, wherein said component (ii) includes an effective amount of a leachable water soluble salt.

19. A microencapsulated composition as defined in claim 18, wherein said leachable water soluble salt comprises sodium or potassium chloride, carbonate or phosphate.

20. A microencapsulated composition as defined in claim 14, wherein shrinkage stresses are created in said coating during curing and drying.

21. A microencapsulated composition comprising
(i) a core material comprising an oxygen generating compound which is potassium superoxide; and
(ii) a coating comprising a combustion resistant composition which is sensitive to water.

22. A microencapsulated composition as defined in claim 21, wherein said component (ii) comprises ceramics, ceramic-organic cements, sol-gel compositions derived from alcoholates of Al, B, Si, or Ti, metal rich cements of zinc oxide or zinc superoxide in combination with a terpenic compound, char-forming phenolic resins, organic polymers with large amounts of heavy metals attached chemically to the polymer backbone, intumescent agents, mixtures of organic polymers and metal oxides, and non-volatile halogen-containing compounds and polymers.

23. A microencapsulated composition as defined in claim 21, wherein said component (ii) comprises an organic copolymer with acrylates and methacrylates, or olefin-maleic anhydride adducts of Zn, Zr, Fe, Ti, Sn or W.

24. A microencapsulated composition as defined in claim 21, which includes an intumescent agent selected from the group consisting of low melting silicate and borate compounds.

25. A microencapsulated composition as defined in claim 21, which includes a metal oxide selected from the group consisting of alumina trihydrate, and the oxides of Zn, Sb and Ti.

26. A microencapsulated composition as defined in claim 21, wherein said component (ii) includes an effective amount of a leachable water soluble salt.

27. A microencapsulated composition as defined in claim 26, wherein said leachable water soluble salt comprises sodium or potassium chloride, carbonate or phosphate.

28. A microencapsulated composition as defined in claim 21, wherein shrinkage stresses are created in said coating during curing and drying.

29. A microencapsulated composition as defined in claim 1 which includes anhydrous lithium hydroxide and potassium superoxide.

30. A microencapsulated composition as defined in claim 1 which consists essentially of potassium superoxide, anhydrous lithium hydroxide and a coating which consists essentially of a wall forming water swellable polymer.

* * * * *